No. 798,414. PATENTED AUG. 29, 1905.
A. S. HUBBARD.
SYSTEM OF ELECTRICAL DISTRIBUTION.
APPLICATION FILED JUNE 24, 1903.
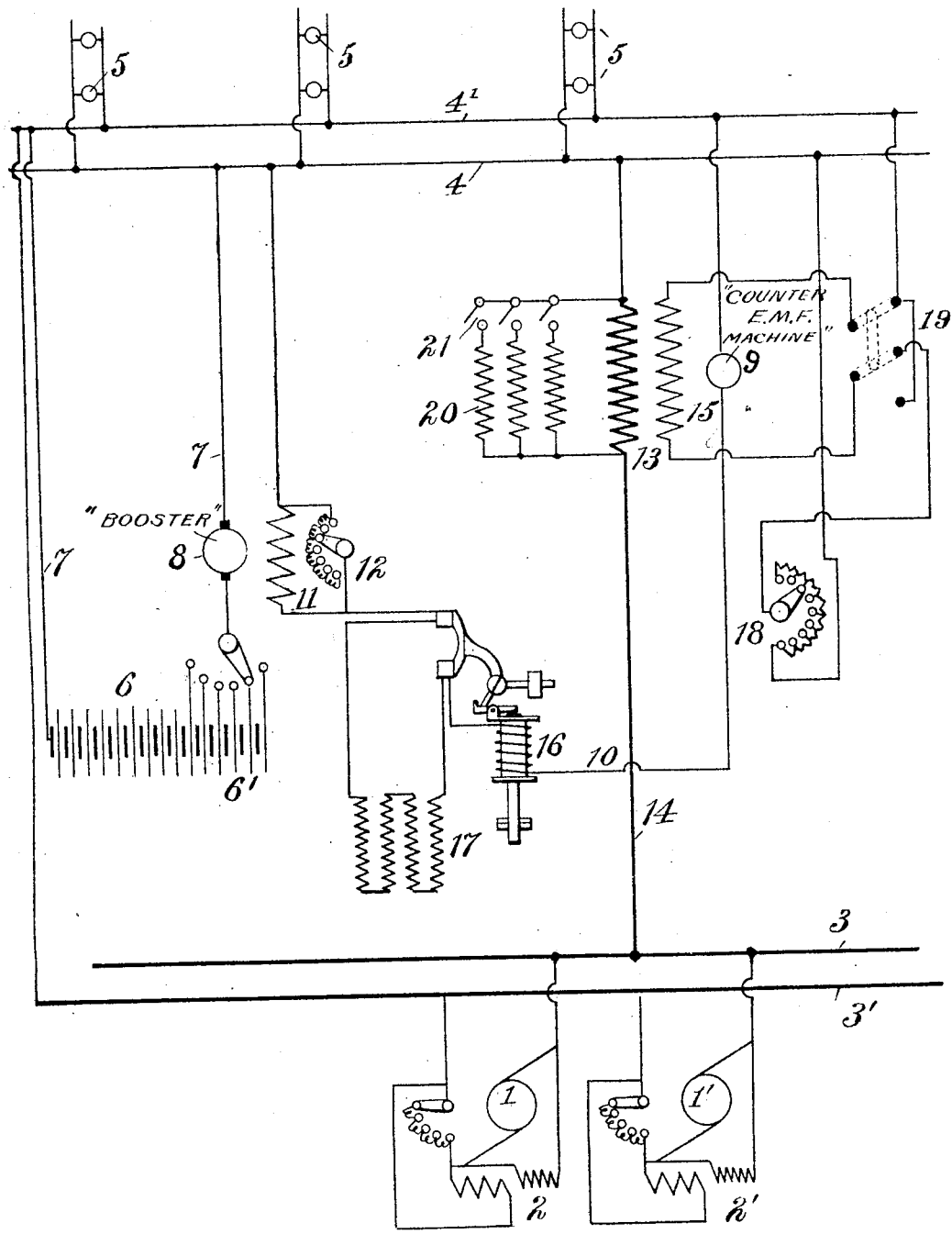

UNITED STATES PATENT OFFICE.

ALBERT S. HUBBARD, OF GREENWICH, CONNECTICUT, ASSIGNOR TO GOULD STORAGE BATTERY COMPANY, OF NEW YORK, N. Y., A CORPORATION OF NEW YORK.

SYSTEM OF ELECTRICAL DISTRIBUTION.

No. 798,414. Specification of Letters Patent. Patented Aug. 29, 1905.

Application filed June 24, 1903. Serial No. 162,845.

*To all whom it may concern:*

Be it known that I, ALBERT S. HUBBARD, a citizen of the United States, residing at Greenwich, in the county of Fairfield, State of Connecticut, have invented certain new and useful Improvements in Systems of Electrical Distribution, of which the following is a specification.

This invention relates to improvements in systems of distribution, and particularly to a system involving the use of a storage battery and booster and regulating apparatus to control the operation of the booster.

The object of my invention is to provide means whereby the winding for controlling the booster electromotive force may with safety be energized by the resultant of potential differences that act oppositely on said winding.

In the accompanying drawing is illustrated in a diagrammatic view a system embodying my invention.

Referring to the drawing, 1 1' represent the generators with their field-coils indicated at 2 2'. The generators are connected to bus-bars 3 3', from which current is taken to supply mains 4 4' for a circuit supplying translating devices for power or light, &c., (indicated at 5.) The storage battery 6 is provided with regulating or "end" cells 6' and is connected across the mains 4 4' in a circuit 7, which includes the armature 8 of the booster. The booster-armature is driven at desired speed by suitable connection from any convenient source of power. The booster-field 11 is energized by the difference between or algebraic sum of the different potentials which act oppositely thereon. In the embodiment of my invention herein shown said booster-field coils are connected in a circuit of a counter-electromotive-force generator 9, the armature of which is connected across the mains 4 4', so that said field-winding is energized by a current which is due to the difference between the voltage of the mains and that of the counter-electromotive-force machine 9. Other means than the counter-electromotive-force machine and the main circuit acting in opposition may be employed for securing the algebraic sum of potential differences in the field-coil 11. The armature of the counter-electromotive-force machine 9 is driven at desired speed. The counter-electromotive-force machine 9 acts to control the amount and direction of the booster electromotive force in accordance with the current flowing through it and the condition of its field. Any convenient means for adjusting the booster-field 11 may be employed—such, for instance, as the regulating-rheostat indicated at 12.

The field of the counter-electromotive-force generator is provided with a coil 13, which is so connected as to be traversed by the current supplied by the generators, being included, for example, in the connection 14 between a dynamo bus-bar 3 and the corresponding side 4 of the mains or work-circuit. The effect of this field may be varied by means of any suitable devices, such as shunts 20 and their switches 21. Other field-regulating devices for the machine 9 may be provided—as, for instance, a coil 15 in a circuit connected, as shown, in parallel with the mains, so that the system may readily be adjusted for different generator-loads by manipulating rheostat 18 and pole-changer 19 included in said circuit.

In the operation of the system it will be seen that the field-winding 11 is energized by a voltage equal to the difference between the potential difference of the mains 4 4' and that of the machine 9. In order that the field-winding 11 may be protected from abnormal increase of current, which obviously may occur through any derangement of the system that would materially affect or cut out either of the sources of potential difference affecting this circuit, I have provided a means for increasing the resistance of the booster-field circuit which acts automatically when the electrical condition of the booster-field-winding circuit permits an abnormal increase of current. This I effect, preferably, by the resistance 17 in series with the field-winding 11 and the circuit-breaker 16, connected in a short circuit around the said resistance. Normally, as shown, the current to the booster-field winding passes through the circuit-breaker and the actuating-coil thereof. When, however, the current increases to the desired limit, the circuit-breaker 16 opens, and the resistance 17 acts to reduce it to a safe quantity. It will be observed that this insertion of resistance in addition to preventing any actual burning out of the field-winding 11 has the advantage of preventing dangerous derangements of the system due to abnormal changes of booster voltage. In the specific regulating apparatus shown the resistance also protects the counter-electromotive-force generator 9.

I desire it to be understood that matters which are herein shown or described but not claimed form the subject-matter of a divisional application, Serial No. 234,013, filed by me November 23, 1904.

It is to be understood that my invention is not limited to the specific arrangement and features shown; but modifications thereof may be made by those skilled in the art without departing from the scope of my invention.

I claim—

1. The combination with a generator, storage battery, booster and work-circuit, of a field-winding for controlling the booster electromotive force, and automatic means for cutting a resistance into circuit with this field-winding upon increase of current in said field-winding.

2. The combination with a generator, storage battery, booster and work-circuit, of a winding for the booster-field, and automatic means for cutting a resistance into circuit with this field-winding upon abnormal change of the electrical condition of the booster-field-winding circuit.

3. The combination with a generator, storage battery, booster, a winding for the booster-field, and means to apply to said winding the resultant of opposing potential differences, of means for automatically increasing the resistance of said field-winding circuit dependent upon abnormal change of the electrical condition of said circuit.

4. The combination with a generator, storage battery, booster, a winding for controlling the booster electromotive force and means for applying the resultant of opposing potential differences to said winding, of means for automatically increasing the resistance of the circuit in which said winding is included, said means being operated by changes of electrical condition of said circuit.

5. The combination with a generator, storage battery, booster, a field-winding for controlling the booster electromotive force, and means for applying to said field-winding the resultant of opposing potential differences, of means for automatically increasing the resistance of said field-winding circuit operated by increase of current therein.

6. The combination with a storage battery, a booster-armature in series with the battery, a field-winding for the booster and means for applying to said field-winding the resultant of opposing potential differences, of means for automatically increasing the resistance of said field-winding circuit dependent upon the electrical condition of said circuit.

7. The combination with a main generator, a storage battery and booster-armature in series therewith connected in parallel with said generator, a field-winding for the booster and means for applying to said field-winding the resultant of opposing potential differences, of a resistance in series with said field-winding and a circuit-breaker in short circuit about said resistance said circuit-breaker operated by abnormal increase of current in the field-winding.

8. A system of electrical distribution having in combination a generator, a storage battery, a booster and a work-circuit, a field-winding for the booster and means for applying to said field-winding the resultant of opposing potential differences, one of said potential differences being substantially constant, and the other being dependent upon the current from the generator, and automatically-operating means for changing the resistance of the booster-field circuit to prevent abnormal or dangerous increases of current therein.

ALBERT S. HUBBARD.

Witnesses:
L. LITTLEFIELD, Jr.,
EDWARD LYNDON.